(12) United States Patent
Aramaki et al.

(10) Patent No.: US 6,721,612 B2
(45) Date of Patent: Apr. 13, 2004

(54) METHOD AND SYSTEM FOR INSTALLING PROGRAM IN PARALLEL COMPUTER SYSTEM

(75) Inventors: Hiromitsu Aramaki, Yokohama (JP); Hiroyuki Takatsu, Yokohama (JP); Akio Tatsumi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 432 days.

(21) Appl. No.: 09/791,698

(22) Filed: Feb. 26, 2001

(65) Prior Publication Data

US 2001/0025200 A1 Sep. 27, 2001

(30) Foreign Application Priority Data

Mar. 23, 2000 (JP) ........................................ 2000-087064

(51) Int. Cl.[7] ............................................... G05B 19/42
(52) U.S. Cl. ............................. 700/87; 700/4; 707/201; 709/221; 710/52; 710/57; 717/172; 717/173; 717/177; 717/178
(58) Field of Search ...................... 700/4, 87; 707/201; 709/221; 710/52, 57; 717/172, 173, 177, 178

(56) References Cited

U.S. PATENT DOCUMENTS

| 5,046,039 | A | * | 9/1991 | Ugajin et al. ................. 710/56 |
| 5,297,257 | A | * | 3/1994 | Struger et al. ................ 700/83 |
| 5,390,297 | A | * | 2/1995 | Barber et al. ................ 713/201 |
| 5,553,083 | A | * | 9/1996 | Miller ........................ 714/748 |
| 5,603,323 | A | * | 2/1997 | Pflugrath et al. ........... 600/437 |
| 5,630,139 | A | * | 5/1997 | Ozaki ......................... 717/167 |
| 5,787,309 | A | * | 7/1998 | Greenstein et al. ........... 710/36 |
| 5,903,566 | A | * | 5/1999 | Flammer, III ................ 370/406 |
| 6,049,853 | A | * | 4/2000 | Kingsbury et al. ......... 711/147 |
| 6,070,203 | A | * | 5/2000 | Hawkins et al. ............. 710/57 |
| 6,144,992 | A | * | 11/2000 | Turpin et al. ................ 709/208 |
| 6,434,642 | B1 | * | 8/2002 | Camilleri et al. ............. 710/57 |
| 6,476,931 | B1 | * | 11/2002 | Aizikowitz et al. ........ 358/1.18 |

FOREIGN PATENT DOCUMENTS

| JP | 06-059994 | 3/1994 |
| JP | 06-309261 | 11/1994 |
| JP | 11-296349 | 10/1999 |

* cited by examiner

Primary Examiner—Ramesh Patel
Assistant Examiner—Douglas M. Shute
(74) Attorney, Agent, or Firm—Mattingly, Stanger & Malur, P.C.

(57) ABSTRACT

A distributing node initiates an install control program in receiving nodes, and then broadcasts or multicasts program data to the receiving nodes. Thereby, the installation of the program into the nodes is carried out in shorter time. In this event, the distributing node and the receiving nodes buffer the program data in units of data block sizes of storage devices associated therewith. The distributing node executes in parallel the processing for storing data read from the storage device in a buffer, and the processing for reading the data from the buffer and broadcasting or multicasting the read data to the receiving node. The receiving node executes in parallel the processing for storing the data received from the distributing node in a buffer, and the processing for reading the program data from the buffer and storing the program data in the storage device thereof.

2 Claims, 10 Drawing Sheets

METHOD AND SYSTEM FOR INSTALLING PROGRAM IN PARALLEL COMPUTER SYSTEM

BACKGROUND OF THE INVENTION

The present invention relates to installation of a program into nodes independent of one another in a parallel computer system including plural nodes.

An installing method for use in a parallel computer system is disclosed, for example, in JP-A-11-296349, wherein upon completion of installation into a particular node, this node serves as a server machine to sequentially install software into different nodes to reduce time required for the installation in the overall system.

Also, JP-A-6-309261 discloses a method including a step of sending an install instruction from a server machine, a step of requesting required software from client machines to the server machine, and a step of starting installation of the software into plural client machines.

Further, JP-A-6-59994 discloses a method including a step of sending an install start instruction and install information from a primary station computer device to plural secondary station computer devices to install a program into plural client machines.

A parallel computer system may include a number of nodes ranging from several tens to several thousands or more because of requirements imposed thereto to execute a large scale of computations. When the same programs are incorporated into these nodes, it is necessary to reduce time required for installing the programs. In the prior art JP-A-11-296349, assuming that the number of nodes in a system is N, and time required for installation per node is T, time required for the installation into all nodes is expressed by $(\log_2 N) \times T$.

SUMMARY OF THE INVENTION

It is an object of the present invention to further reduce the above installation time $(\log_2 N) \times T$ required for installing into plural nodes.

The present invention is characterized by simultaneously performing install processing in plural nodes by simultaneously transferring data on a program to be installed, utilizing communication means interconnecting the respective nodes.

An arbitrary node in a parallel computer system reads every predefined amount of programs from a storage medium which stores the programs, and delivers program data to all nodes, into which the programs are to be installed, through the communication means. Each node receives the data and writes the data into a storage device of the node itself to install the same program in parallel.

Also, a master install control program for distributing a program is executed by one node or an install device in the parallel computer system. The master install control program reads a program from a storage medium which stores programs, and transfers the read program. In this event, plural buffers are used for communication of data associated with the reading and transferring of the program.

A node receiving the program executes an install control program for receiving the distributed data. The install control program receives data on the program, which is to be executed in the node, from the distribution node, and writes the received data into a storage device of the node itself. Plural buffers are utilized for communication of data during the reception of data and the writing into the storage device.

The master install control program and the install control program rely on the buffers to process in parallel the reading of the program from the recording medium, the delivery of the read program, the reception of the program, and the writing of the program into the storage device, to reduce time required for installing the program into plural nodes.

In an environment in which the present invention is implemented under the best condition, transfer time is calculated as follows. Assuming for example that the number of nodes is N; a total data size of a program to be distributed is A; a predefined amount of data size for distribution is B; time required for reading the predefined amount of data is C; time required for transferring the predefined amount of data to all nodes is D; time required for receiving the predefined amount of data is E; and time required for writing the predefined amount of data into an external storage device is F, time required for installing the program into all nodes is expressed by $((A/B) \times F)+(C+D+E)$. $(C+D+E)$ is time taken for transferring the first predefined amount of data in the processing for writing the predefined amount of data into the external storage device. Subsequently, the data read processing, the transfer-to-node processing and the data reception processing are performed in parallel through the buffers, so that time required for the processing is included in time required for writing data into the storage device.

As described above, since a program is distributed to all nodes at one time, time required for installing the program into all the nodes does not depend on the number of nodes N.

DETAILED DESCRIPTION OF THE EMBODIMENTS

Figure 1:
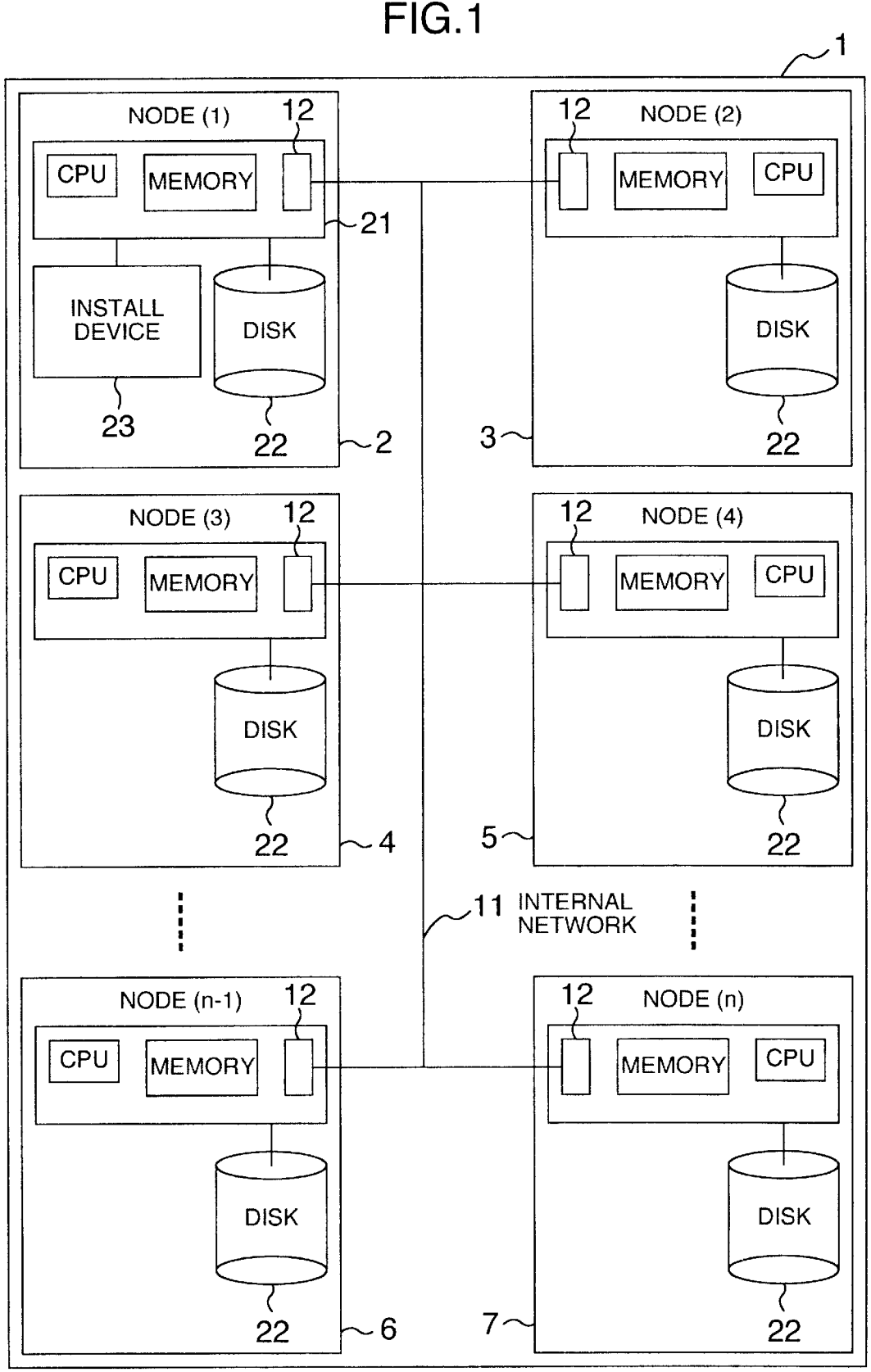
FIG. 1 is a block diagram illustrating the configuration of a parallel computer system.

FIG. 1 illustrates the configuration of a parallel computer system. In a parallel computer system 1, plural nodes, each including a CPU, a memory and a disk drive, are interconnected through an internal network 11.

For example, a node (1) 2 includes a computation unit (1) 21 having a CPU and a memory; a disk 22; and an install device 23 such as a hard disk or a magnetic tape. The node (1) 2 is connected to the internal network 11 through a communication device 12 which has a broadcast or multicast transfer function. In this way, all nodes (i.e., node (1) 2, node (2) 3, node (3) 4, node (4) 5, . . . , node (n−1) 6 and node (n) 7) are interconnected to the internal network 11.

The disk 22 is an external storage device for storing a distributed program, and may be implemented by a hard disk or the like. The install device 23 is an external storage device for storing programs to be distributed, and may be implemented by a hard disk, a magnetic tape, an optical disk or the like. Alternatively, instead of the external storage device connected to each node, a storage region may be reserved on a memory in each node, or a program may be directly stored in a work region.

Figure 2:
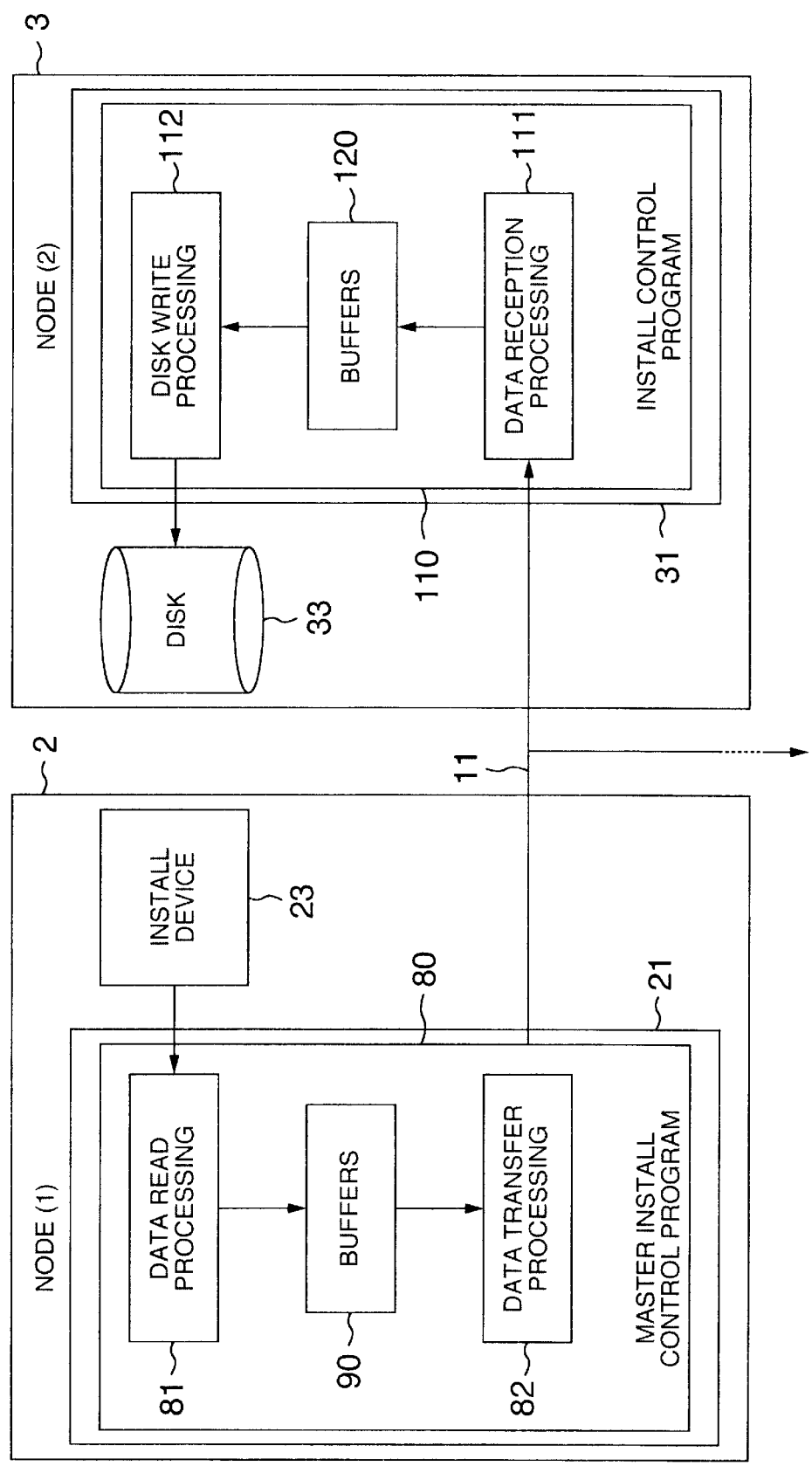
FIG. 2 is a diagram illustrating a data flow during installation of a program.

FIG. 2 is a block diagram illustrating an example in which a program to be distributed is read from the install device 23 and installed into all the nodes through the internal network 11. Data read processing 81 at the node (1) 2 reads every predefined amount of the program to be distributed, to data dividing buffers 90 from the install device 23 storing the program to be distributed. Data transfer processing 82 transfers the data read into the buffers to all the nodes to which the program is to be distributed, through the internal network 11. One of all the nodes is represented by the node (2) 3. In the node (2) 3, data reception processing 111 remains in a data waiting state, for waiting data from the network 11. As the program data is delivered by the data transfer processing 82, the data reception processing 111 initiates to read the transferred data into data dividing buffers 120. Disk write processing 112 writes the data read into the buffers into a disk 33 of the node (2) 3.

A master install control program 80 including the data read processing 81 and the data transfer processing 82, and an install control program 120 including the data reception processing 111 and the disk write processing 112 are stored in the storage device of each node. Alternatively, the install control program 110 and the master install control program 80 may be stored in a storage device of a distributing node, such that the distributing node distributes the install control program 110 to receiving nodes when the parallel computer system is powered on. In this event, the distributing node sequentially transfers the install control program to the receiving nodes.

Figure 3:
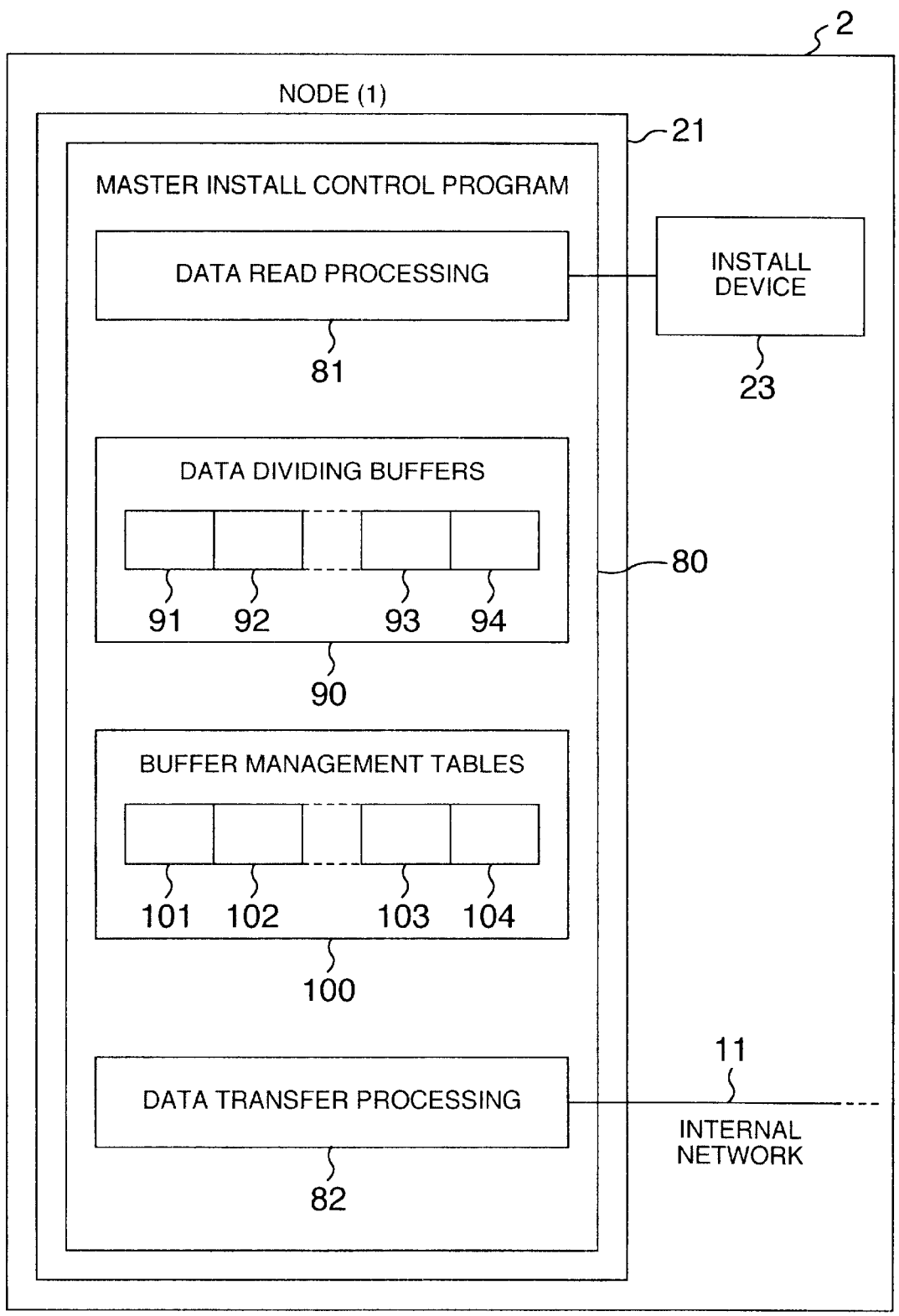
FIG. 3 is a block diagram illustrating the configuration of a master install control program.

FIG. 3 illustrates the configuration of the master install control program 80. In the node (1) 2 to which the install device 23 storing the program to be distributed is connected, the master install control program 80 transfers every predefined amount of data read from the install device 23 to all of the node (1) 2, node (2) 3, node (3) 4, node (4) 5, . . . , node (n−1) 6 and node (n) 7 to which the program is distributed. In the following, the master install control program 80 will be described in detail.

The master install control program 80 includes the data read processing 81 for reading data from the install device 23 which stores programs; the data transfer processing 82 for transferring the data read in the data read processing 81 to all the nodes; data dividing buffers 90 each of which stores the predefined amount of data read from the install device 23 which stores programs; and buffer management tables 100 for managing the data dividing buffers 90. Each buffer in the data dividing buffers 90 has a size equivalent to that of the predefined amount read from the install device 23.

The buffer management tables 100 store information indicative of the states of the associated buffers to control the data dividing buffers 90 used in the data read processing 81 and the data transfer processing 82. The buffer management tables 100 include table (1) 101, table (2) 102, . . . , table (m−1) 103 and table (m) 104 corresponding to buffer (1) 91, buffer (2) 92, . . . , buffer (m−1) 93 and buffer (m) 94 in the data dividing buffers 90.

Figure 4:
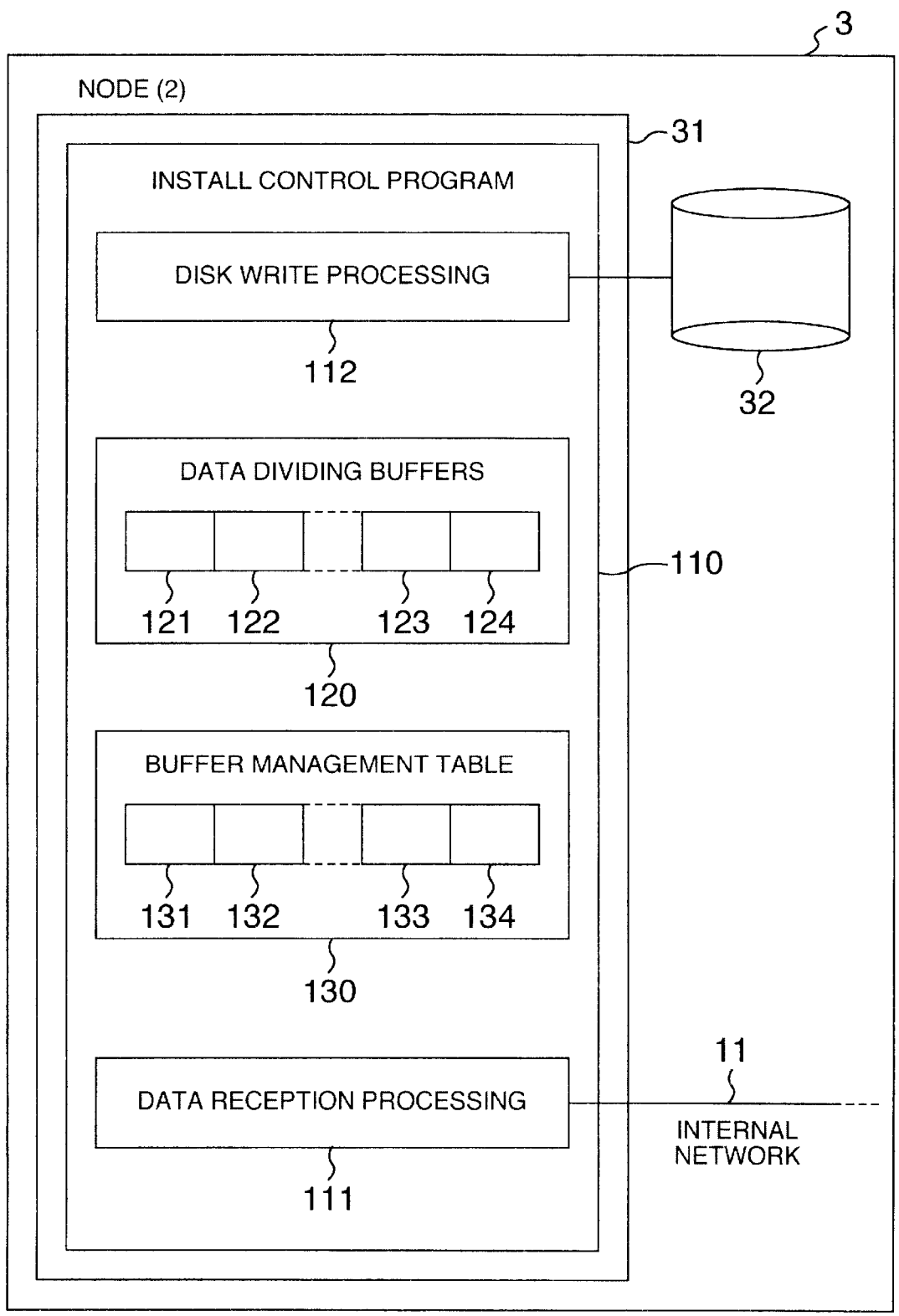
FIG. 4 is a block diagram illustrating the configuration of an install control program.

FIG. 4 illustrates the configuration of the install control program 110.

The install control program 110 in each of the node (1) 2, node (2) 3, node (3) 4, node (4) 5, . . . , node (n−1) 6 and node (n) 7 is initiated by the master install control program 80.

The install control program 110 includes data reception processing 111 for receiving data transferred from the master install control program 80; disk write processing 112 for writing data read in the data reception processing 111 into a disk; data dividing buffers 120 for storing every predefined amount of data transferred from the master install control program 80 and received in the data reception processing 111; and buffer management tables 130 for managing the data dividing buffers 120. Each buffer in the data dividing buffers 120 has a size equivalent to that of the predefined amount read from the install device 23.

The operation of the master install control program 80 in the configuration of FIG. 3 will be described along flow charts illustrated in FIGS. 5, 6 and 7.

Figure 5:
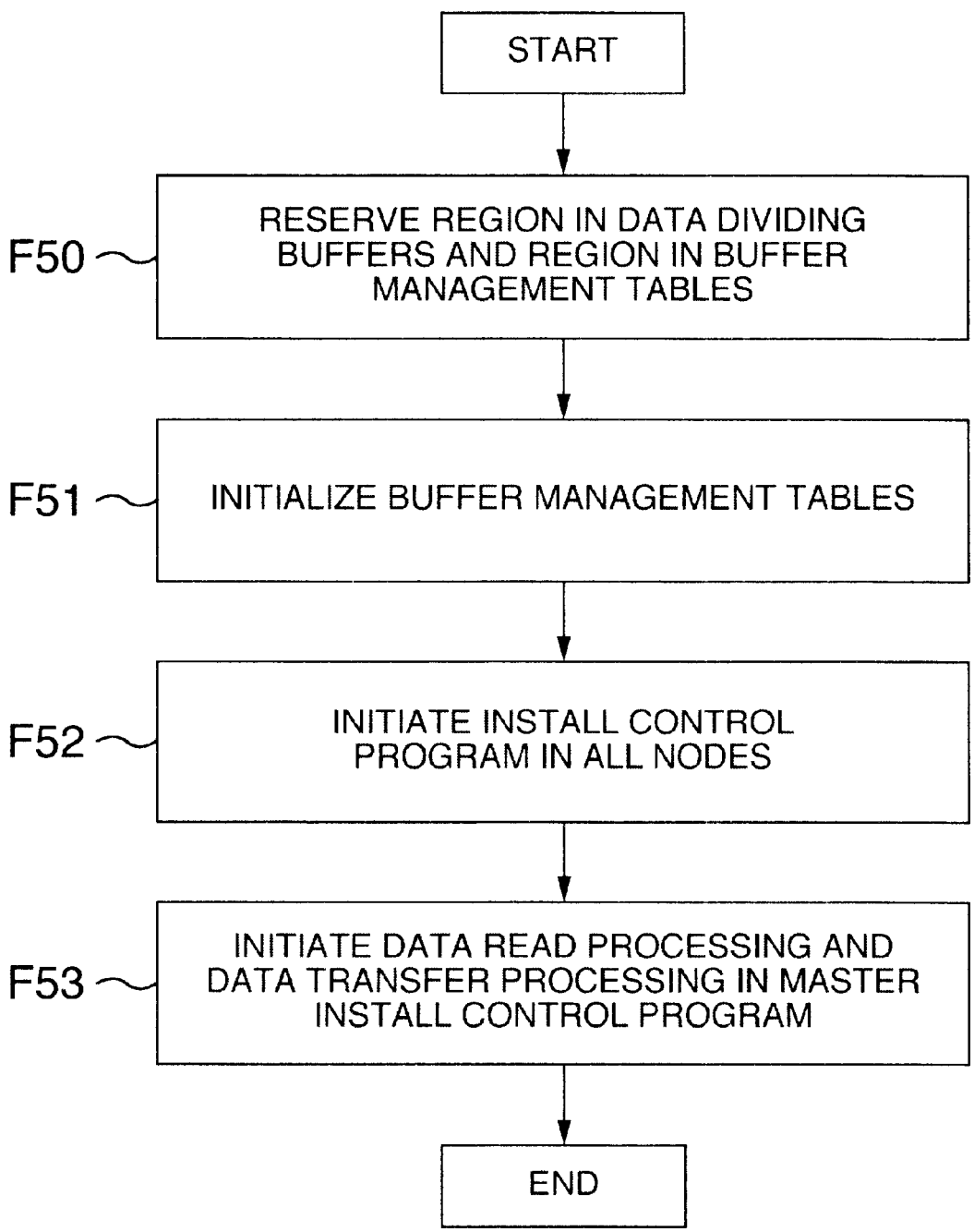
FIG. 5 is a flow chart illustrating the flow of processing executed by the master install control program.

The flow chart in FIG. 5 illustrates the flow of processing executed by the master install control program 80. First, the master install control program 80 reserves a region in the data dividing buffers 90 for storing data read from the install device 23, and a region in the buffer management tables 100 for managing the data dividing buffers 90 (F50), and initializes the data division management tables 100 to an initial state (F51). Next, the program 80 initiates the install control programs 110 in all the nodes (F52). Finally, the program 80 initiates the data read processing 81 and the data transfer processing 82 in the master install control program 80 (F53). In this event, the install control programs 110 in all the nodes are sequentially initiated in each of the nodes (F52).

Each of the receiving nodes is additionally provided with confirmation means for confirming whether a node power source is ON or OFF, and notification means for notifying a distributing node of the power-source state of the node itself. The distributing node may identify receiving nodes in which the power source is in ON state, before initiating the install control program 110 in all the nodes (F52), to initiate the install control programs 110 in the operable receiving nodes (F52).

Figure 6:
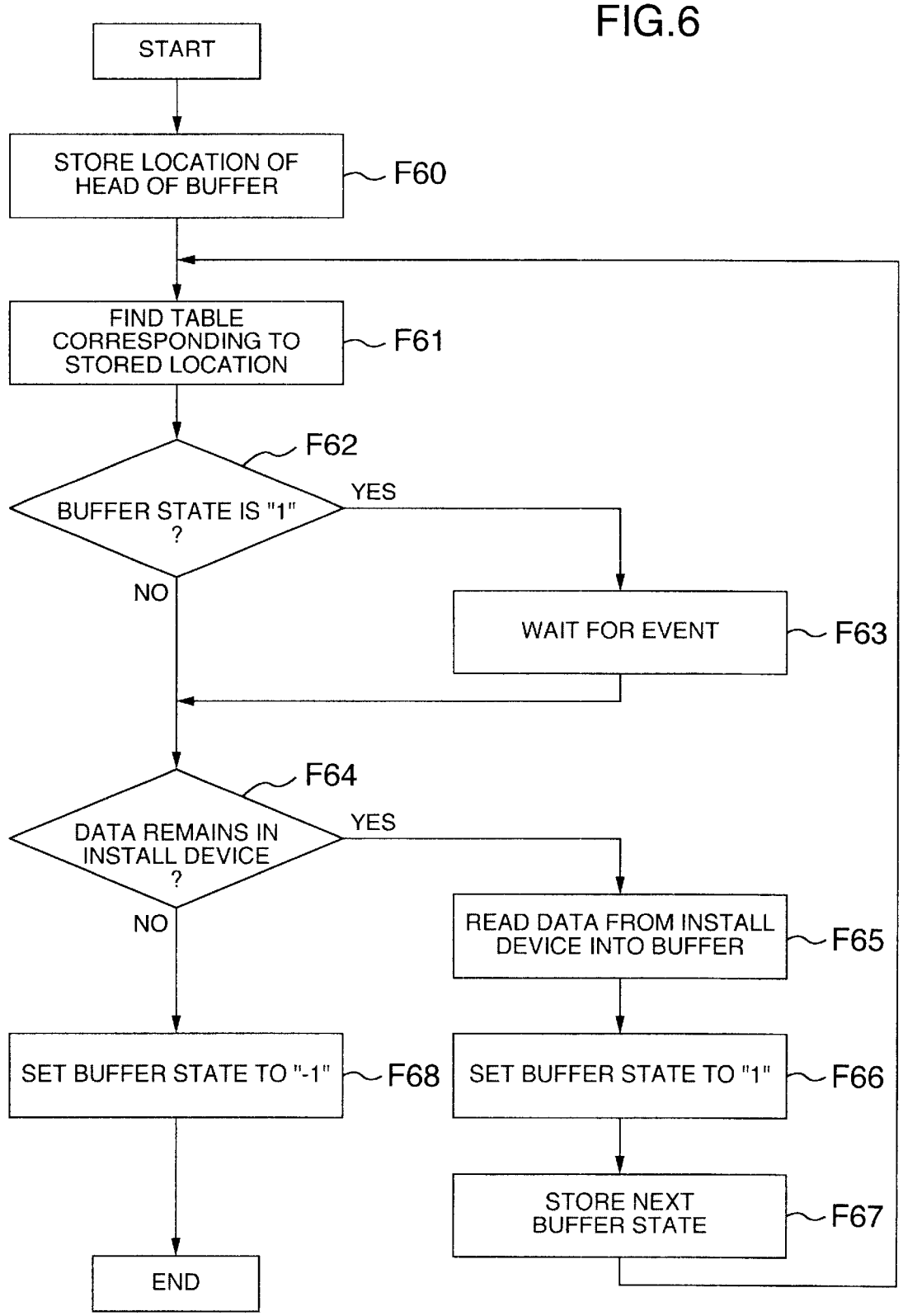
FIG. 6 is a flow chart illustrating data read processing in the master install control program.

FIG. 6 is a flow chart illustrating the data read processing 81. The data read processing 81 is the processing for sequentially reading the predefined amount of data from the install device 23 into buffer (1) 91, buffer (2) 92, . . . , buffer (m−1) 93 and buffer (m) 94.

The data read processing 81 stores the location of the buffer (1) 91 which is the head of the data dividing buffers 90 (F60). Next, the data read processing 81 finds a corresponding table in the buffer management tables 100 from the stored buffer location (F61), and checks the state of the buffer from the found table (F62). A buffer may take one of the following four states: a state (a reading-in-progress state) in which the predefined amount of data is being read from the install device 23 into the buffer; a state (a reading-completion state) in which the data has been completely read into the buffer; a state (a transfer-completion state) in which the data has been completely transferred to all the nodes; and a state in which a program has been fully read from the install device 23 (End of File). These states are represented by numerical values 0, 1, 0, −1 from the first state. It should be noted that the reading-in-progress state and the transfer-completion state are synonym. When the buffer is in the state "1," the processing 81 waits for an event (F63). When the buffer is in the state "0," the processing 81 checks whether or not data still remains in the install device 23 (F64). If data remains, the predefined amount of data is read from the install device 23 into the buffer (F65). Then, the processing 81 transitions the state of the buffer to the reading-completion state (F66). The processing 81 finds and stores the location of the next buffer (F67), and returns to F61. If no data remains in the install device 23, the processing 81 sets a table corresponding to the buffer location to "−1" (F68), followed by termination of the flow. The correspondence between the buffers and the tables is made by reserving arrays of the same length. If the end location of the array is reached in determining the next location, the head of the array is pointed. Also, when the state of the buffer is set to "1" (F66), and when the data transfer processing 82 is waiting for an event when the state of the buffer is set to "−1" (F68), the data transfer processing 82 is released from the event waiting state, and forced to continue the processing.

Figure 7:
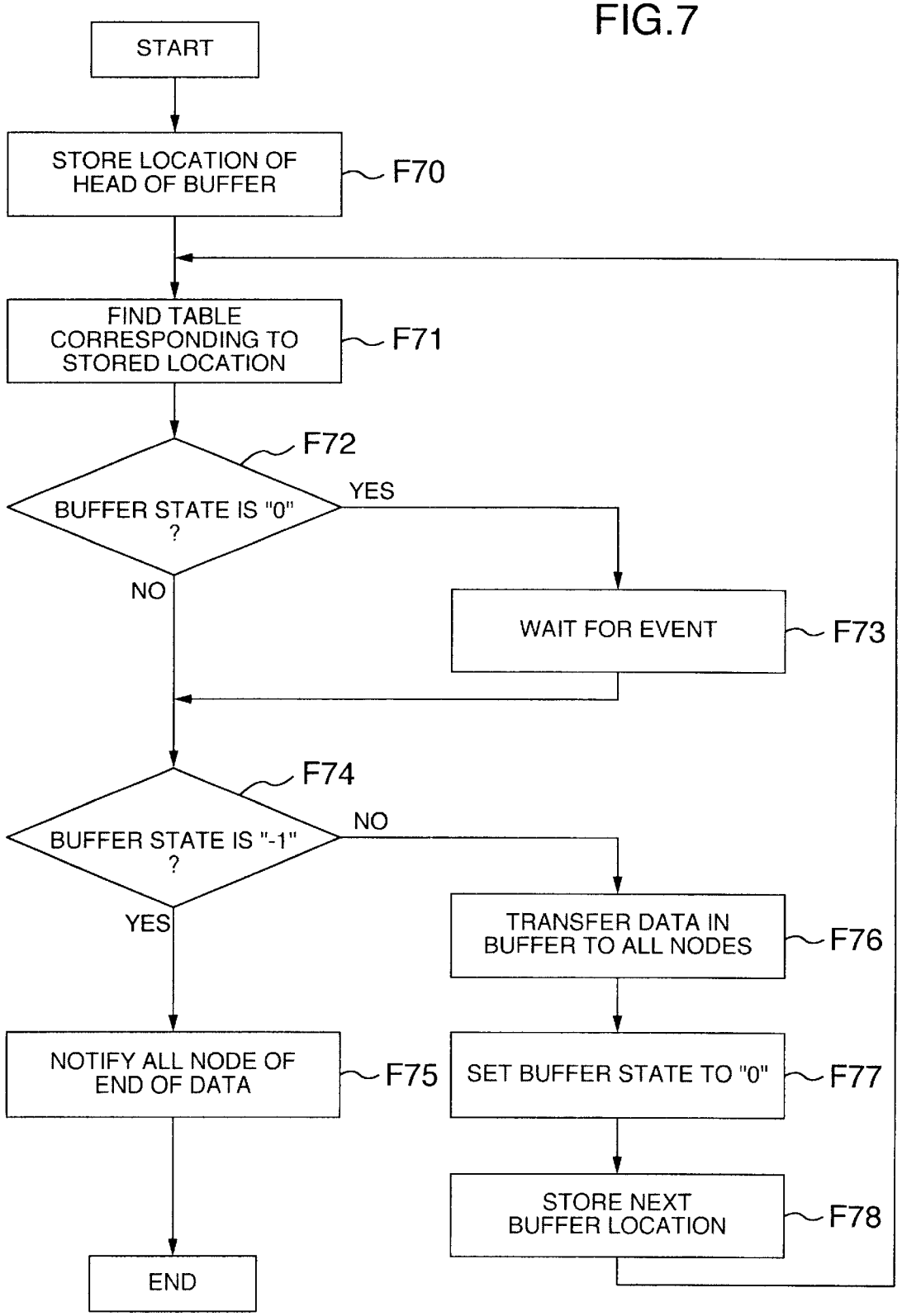
FIG. 7 is a flow chart illustrating data transfer processing in the master install control program.

FIG. 7 is a flow chart illustrating the data transfer processing 82. The data transfer processing 82 is the processing for transferring data read into the data dividing buffers 90 in the data read processing 81 to the install control program 110 in each of the nodes. The data transfer processing 82 stores the location of the buffer (1) 91 which is the head of the data dividing buffers 90 (F70).

Next, the processing 82 finds a corresponding table in the buffer management tables 100 from the stored buffer location (F71), and checks the state of the buffer from the found table (F72, F74). The buffer may take one of the four states similar to the foregoing. When the buffer is in the state "0," the processing 82 waits for an event (F73). When the buffer is in the state "−1," the processing 82 notifies all the nodes that the data has been fully read (the end of data is reached) (F75), followed by termination of the flow. When the buffer is in the state "1," the processing 82 transfers the data in the buffer to all the nodes (F76). Then, the processing 82 transitions the state of the buffer to the transfer-completion state (F77), stores the location of the next buffer (F78), and returns to F71. If the end location of the array is reached in determining the next location, the head of the array is pointed in a manner similar to the foregoing. Also, when the data read processing 81 is waiting for an event when the state of the buffer is set to "0" (F77), the data read processing 81 is released from the event waiting state, and forced to continue the processing.

Next, the operation of the install control program 110 in the configuration of FIG. 4 will be described along flow charts illustrated in FIGS. 8, 9 and 10.

Figure 8:
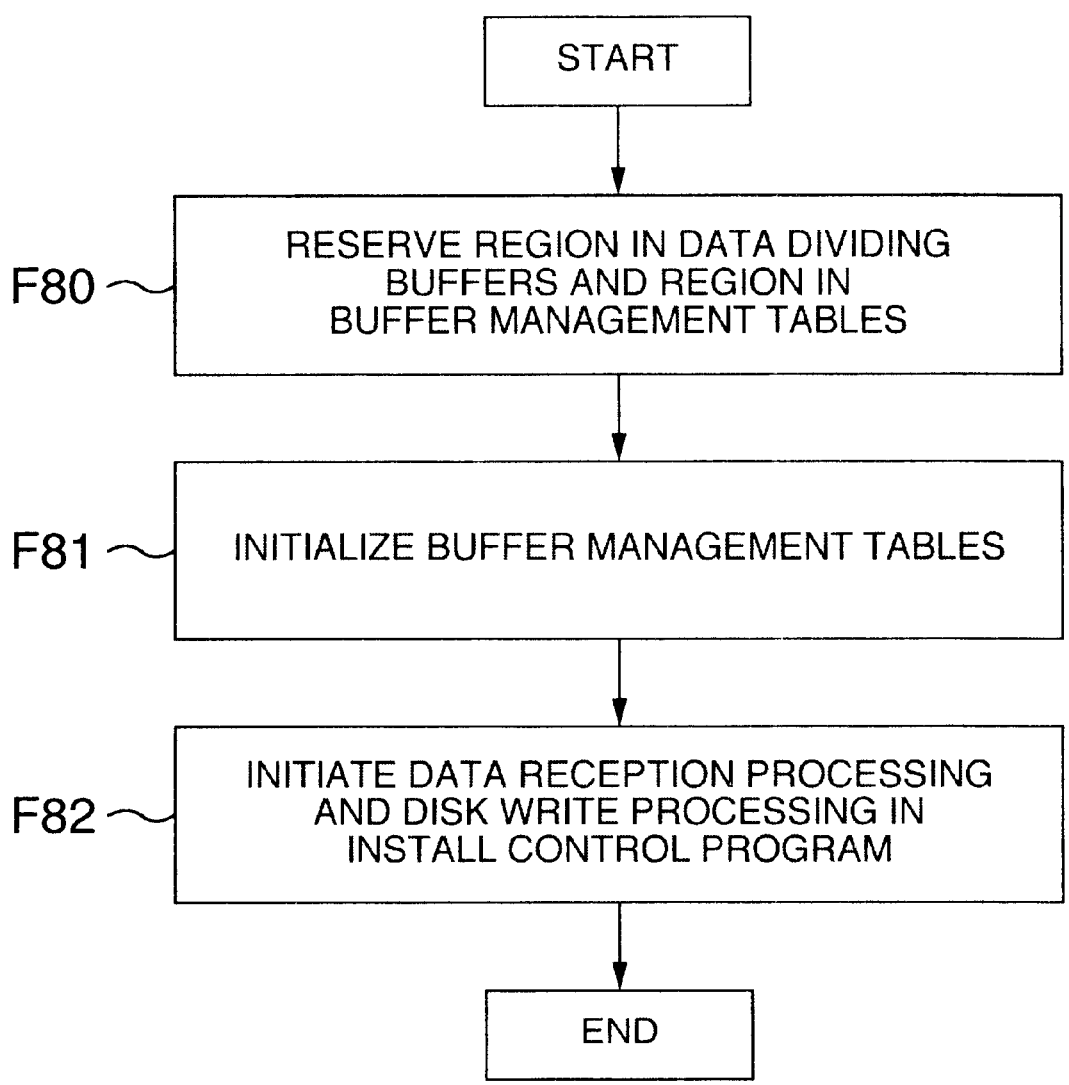
FIG. 8 is a flow chart illustrating the flow of processing executed by the install control program.

The flow chart in FIG. 8 illustrates the flow of processing executed by the install control program 110. First, the program 110 reserves a region in the data dividing buffers 120 for storing data transferred from the data transfer processing 82 in the master install control program 80, and a region in the buffer management tables 130 for managing the data dividing buffers 120 (F80), and initializes the data division management tables 130 (F81) into the initial state. Finally, the program 110 initiates the data reception processing 111 and the disk write processing 112 in the install control program 110 (F82).

Figure 9:
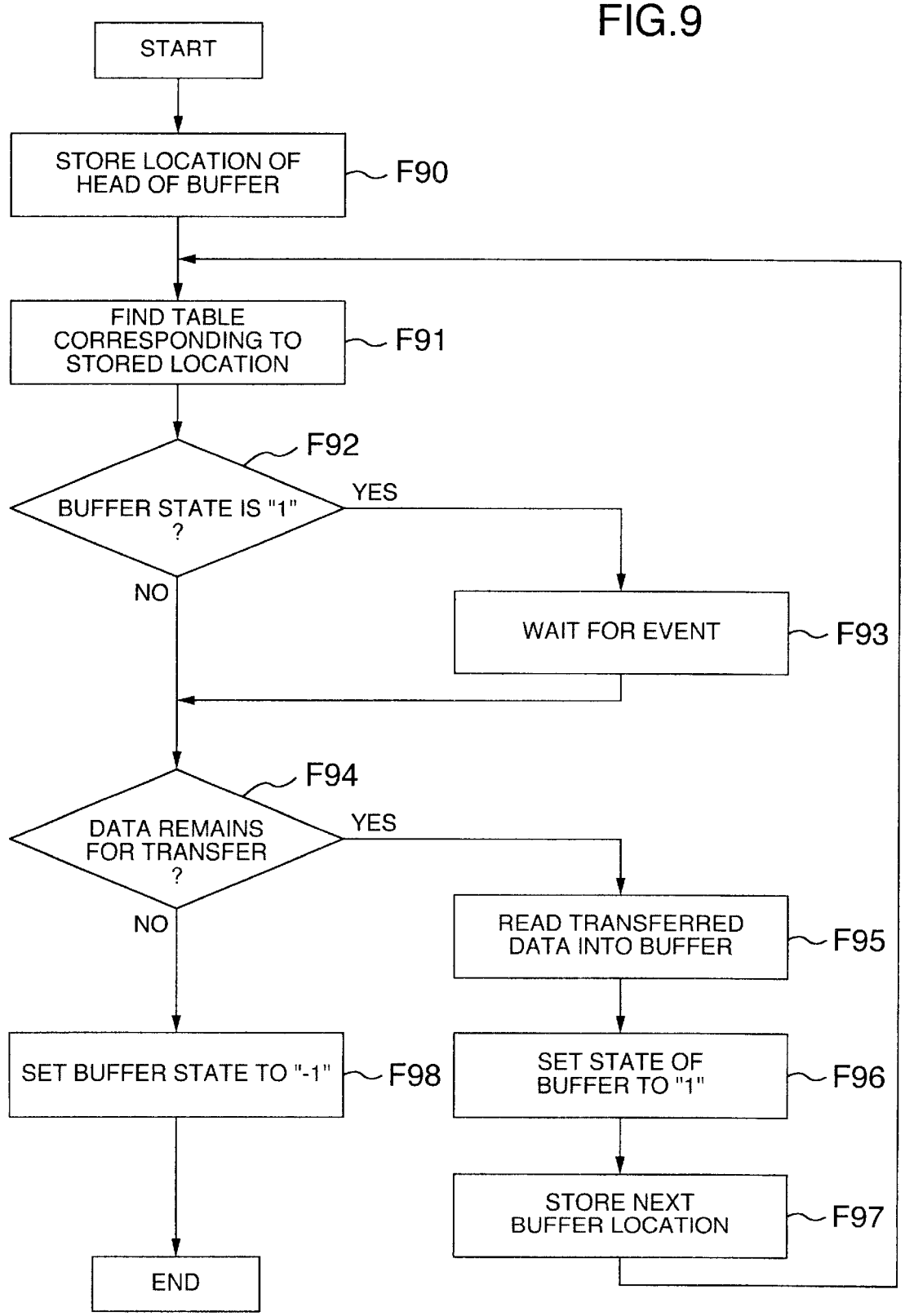
FIG. 9 is a flow chart illustrating data reception processing in the install control program.

FIG. 9 is a flow chart illustrating the data reception processing 111. The data reception processing 111 is the processing for sequentially receiving the predefined amount of data from the data transfer processing 82 in the master install control program 80 in buffer (1) 121, buffer (2) 122, . . . , buffer (m−1) 123 and buffer (m) 124.

The data reception processing 111 stores the location of the buffer (1) 121 which is the head of the data dividing buffers 120 (F90).

Next, the processing 111 finds a corresponding table in the buffer management tables 130 from the stored buffer location (F91), and checks the state of the buffer from the table (F92). The buffer may take one of the following four states: a state (a reception-in-progress state) in which data is being received from the data transfer processing 82; a state (a receiving-completion state) in which data has been completely received; a state (a writing-completion state) in which data has been completely written into a disk, and a state in which the end of data has been reached. The respective states are represented by numerical values 0, 1, 0, −1 from the first one. It should be noted that the reception-in-progress state and the writing-completion state are synonym. When the buffer is in the state "1," the processing 111 waits for an event (F93). When the buffer is in the state "0," the processing 111 checks whether or not data to be transferred from the data transfer processing 82 still remains (F94). If data remains, data transferred from the data transfer processing 82 is read into the buffer (F95). Then, the processing 111 transitions the state of the buffer to the receiving-completion state (F96). The processing 111 finds and stores the location of the next buffer (F97), and returns to F91. If no data remains, the processing 111 sets a table corresponding to the buffer location to "−1" (F98), followed by termination of the flow. The correspondence between the buffers and the tables is made by reserving arrays of the same length. If the end location of the array is reached in determining the next location, the head of the array is pointed. Also, when the state of the buffer is set to "1" (F96), and when the data write processing 112 is waiting for an event when the state of the buffer is set to "−1" (F98), the data write processing 112 is released from the event waiting state, and forced to continue the processing.

Figure 10:
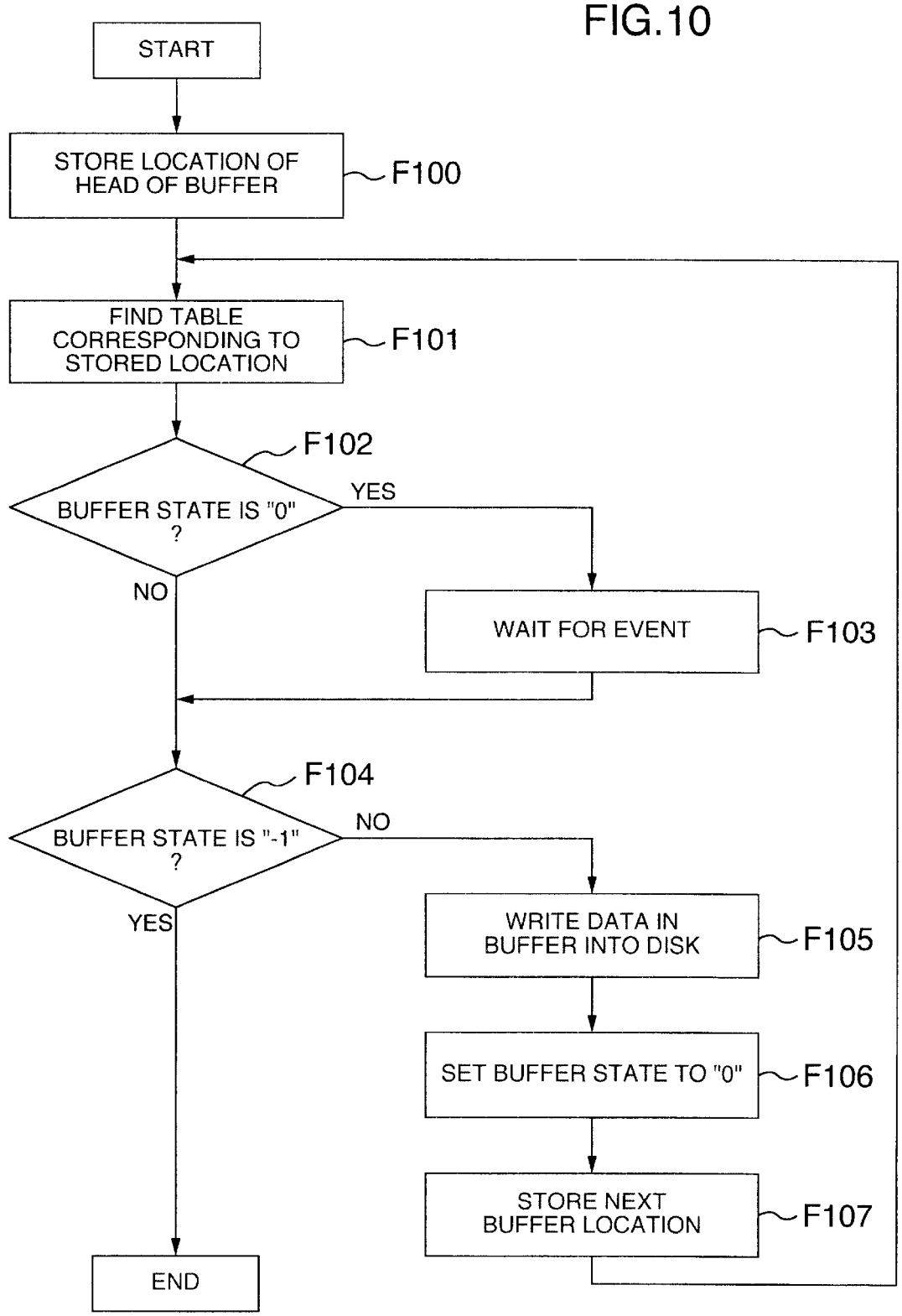
FIG. 10 is a flow chart illustrating disk write processing in the install control program.

FIG. 10 is a flow chart illustrating the disk write processing 112. The disk write processing 112 is the processing for writing data read into the data dividing buffers in the data reception processing 111 into a disk connected to the node. The disk write processing 112 stores the location of the buffer (1) 121 which is the head of the data dividing buffers 120 (F100).

Next, the processing 112 finds a corresponding table in the buffer management tables 130 from the stored buffer location (F101), and checks the state of the buffer from the found table (F102, F104). The buffer may take one of the four states similar to the foregoing. When the buffer is in the state "0," the processing 112 waits for an event (F103). When the buffer is in the state "−1," the flow is terminated. When the buffer is in the state "1," the processing 112 writes the data in the buffer into a disk (F105). Then, the processing 112 transitions the state of the buffer to the writing-completion state (F106), finds and stores the location of the next buffer (F107), and returns to F101. If the end location of the array is reached in determining the next location, the head of the array is pointed in a manner similar to the foregoing. Also, when the data reception processing 111 is waiting for an event when the state of the buffer is set to "0" (F106), data reception processing 111 is released from the event waiting state, and forced to continue the processing.

The foregoing description has been made for the embodiment according to the present invention which distributes the executed-in-parallel program in the parallel computer system including plural nodes interconnected through the internal network. It goes without saying, however, that the present invention can be applied to a system which has plural computers connected to a network and executed in parallel by multicasting program data from a distributing node to receiving nodes.

What is claimed is:

1. A method for installing a program to be executed in parallel in a parallel computer system in which a distributing node for delivering said program and at least one of receiving nodes for receiving and executing said program are connected via an internal network, said method comprising the steps of:

a) storing each of data blocks divided in a block size from said program stored in a storage device, to each of storage areas of a first data buffer divided in said block size in order, in said distributing node;
 b) sending each of said data blocks read from said first data buffer to said receiving nodes in order, in parallel of said storing process in said step a), based on a first buffer management table storing buffer states corresponding to said storage areas of said first data buffer, in said distributing node;
 c) storing said data blocks received from said distributing node to storage areas of a second data buffer divided in said block size in order, in said receiving node; and
 d) storing each of said data blocks read from said second data buffer to a storage device of each of said receiving nodes in order, in parallel of said storing process in said step c), based on a second buffer management table storing buffer states corresponding to said storage areas of said second data buffer, in said receiving node.

2. A parallel computer system in which a distributing node for delivering a program and at least one of receiving nodes for receiving and executing said program are connected via an internal network, comprising:

first storing means for storing each of data blocks divided in a block size from said program stored in a storage device, to storage areas of a first data buffer divided in said block size in order, in said distributing node;
 sending means for sending each of said data blocks read from said first data buffer to said receiving nodes in order, in parallel of said storing process in said first storing means, based on a first buffer management table storing buffer states corresponding to each of said storage areas of said first data buffer, in said distributing node;
 second storing means for storing said data blocks received from said distributing node to each of storage areas of a second data buffer divided in said block size in order, in said receiving node; and
 third storing means for storing each of said data blocks read from said second data buffer to a storage device of each of said receiving nodes in order, in parallel of said storing process in said second storing means, based on a second buffer management table storing buffer states corresponding to each of said storage areas of said second data buffer, in said receiving node.

* * * * *